(12) United States Patent
Kataoka et al.

(10) Patent No.: US 9,087,118 B2
(45) Date of Patent: Jul. 21, 2015

(54) INFORMATION SEARCH APPARATUS, AND INFORMATION SEARCH METHOD, AND COMPUTER PRODUCT

(75) Inventors: Masahiro Kataoka, Kawasaki (JP); Keishiro Tanaka, Kawasaki (JP); Yuji Watanabe, Kawasaki (JP); Takashi Tsubokura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 457 days.

(21) Appl. No.: 12/507,680

(22) Filed: Jul. 22, 2009

(65) Prior Publication Data

US 2009/0327284 A1    Dec. 31, 2009

Related U.S. Application Data

(63) Continuation of application No. PCT/JP2007/051069, filed on Jan. 24, 2007.

(51) Int. Cl.
G06F 17/30    (2006.01)

(52) U.S. Cl.
CPC ...... G06F 17/3061 (2013.01); G06F 17/30011 (2013.01)

(58) Field of Classification Search
CPC .................. G06F 17/30011; G06F 17/30657
See application file for complete search history.

(56) References Cited

U.S. PATENT DOCUMENTS

| 4,888,730 | A | * | 12/1989 | McRae et al. ................. 715/206 |
| 5,008,810 | A | * | 4/1991 | Kessel et al. .................. 715/234 |
| 5,235,654 | A | * | 8/1993 | Anderson et al. ............. 382/180 |
| 5,263,174 | A | * | 11/1993 | Layman ........................ 715/841 |
| 5,267,155 | A | * | 11/1993 | Buchanan et al. ............ 715/210 |
| 5,303,150 | A | * | 4/1994 | Kameda ............................ 704/9 |
| 5,305,205 | A | * | 4/1994 | Weber et al. .................. 715/234 |
| 5,530,644 | A | * | 6/1996 | Maruta et al. ..................... 704/4 |
| 5,551,049 | A | * | 8/1996 | Kaplan et al. ................. 715/206 |
| 5,604,910 | A | * | 2/1997 | Kojima et al. ...................... 1/1 |
| 5,802,534 | A | * | 9/1998 | Hatayama et al. ............ 715/205 |
| 5,907,841 | A | * | 5/1999 | Sumita et al. ...................... 1/1 |
| 6,064,383 | A | * | 5/2000 | Skelly ............................ 715/758 |
| 6,473,754 | B1 | * | 10/2002 | Matsubayashi et al. .............. 1/1 |

(Continued)

FOREIGN PATENT DOCUMENTS

| JP | A 9-91297 | 4/1997 |
| JP | A 9-91304 | 4/1997 |

(Continued)

OTHER PUBLICATIONS

Notice of Rejection issued in corresponding Japanese Patent App. No. 2008-554930, issued Aug. 31, 2011.

*Primary Examiner* — Jung Kim
*Assistant Examiner* — James J Wilcox
(74) *Attorney, Agent, or Firm* — Greer Burns & Crain, Ltd.

(57) ABSTRACT

A computer-readable recording medium stores therein an information search program that causes a computer to search for text items described in a text file. The information search program causes the computer to execute receiving input of a search keyword; searching an index file for a writing keyword that includes the search keyword, the index file including writing keywords described, for respective entries, in an order identical to the order in which the text items are described in the text file; identifying an entry that corresponds to the writing keyword retrieved at the searching; and outputting the identified entry.

8 Claims, 13 Drawing Sheets

(56) References Cited

U.S. PATENT DOCUMENTS

| | | | |
|---|---|---|---|
| 7,039,636 B2 | 5/2006 | Tada et al. | |
| 7,191,177 B2* | 3/2007 | Konaka | 707/758 |
| 7,644,076 B1* | 1/2010 | Ramesh et al. | 707/999.006 |
| 8,107,731 B2* | 1/2012 | Okumura | 382/185 |
| 2003/0177116 A1* | 9/2003 | Ogawa | 707/4 |
| 2003/0200211 A1 | 10/2003 | Tada et al. | |
| 2004/0002945 A1* | 1/2004 | Shibata | 707/1 |
| 2004/0161150 A1* | 8/2004 | Cukierman et al. | 382/186 |
| 2004/0193589 A1* | 9/2004 | Tago et al. | 707/3 |
| 2004/0220898 A1* | 11/2004 | Eguchi et al. | 707/1 |
| 2004/0253978 A1* | 12/2004 | Horiguchi | 455/550.1 |
| 2004/0255218 A1* | 12/2004 | Tada et al. | 714/747 |
| 2006/0101004 A1* | 5/2006 | Matsubayashi et al. | 707/3 |
| 2007/0073668 A1* | 3/2007 | Stephan | 707/3 |

FOREIGN PATENT DOCUMENTS

| | | |
|---|---|---|
| JP | 2000-231563 | 8/2000 |
| JP | A 2005-158044 | 6/2005 |
| WO | WO 2006/123429 A1 | 11/2006 |
| WO | WO 2006/123448 A1 | 11/2006 |

* cited by examiner

| ENTRY WORD ALL CHARACTERS | NON-SORTED INDEX FILE ID ||||||||
|---|---|---|---|---|---|---|---|---|
| | 0 | 1 | 2 | 3 | ... | i | ... | n |
| あ | 1 | 0 | 0 | 1 | ... | 0 | ... | 0 |
| ... | ... | ... | ... | ... | ... | ... | ... | ... |
| 会 | 0 | 1 | 0 | 0 | ... | 1 | ... | 0 |
| ... | ... | ... | ... | ... | ... | ... | ... | ... |
| 壊 | 0 | 0 | 0 | 1 | ... | 0 | ... | 0 |
| ... | ... | ... | ... | ... | ... | ... | ... | ... |
| 環 | 1 | 0 | 0 | 1 | ... | 1 | ... | 0 |
| ... | ... | ... | ... | ... | ... | ... | ... | ... |
| 議 | 0 | 1 | 0 | 1 | ... | 1 | ... | 0 |
| ... | ... | ... | ... | ... | ... | ... | ... | ... |
| 境 | 1 | 0 | 0 | 0 | ... | 1 | ... | 0 |
| ... | ... | ... | ... | ... | ... | ... | ... | ... |
| 国 | 0 | 0 | 0 | 0 | ... | 1 | ... | 0 |
| ... | ... | ... | ... | ... | ... | ... | ... | ... |
| 際 | 0 | 0 | 0 | 0 | ... | 1 | ... | 1 |
| ... | ... | ... | ... | ... | ... | ... | ... | ... |
| 破 | 0 | 0 | 0 | 1 | ... | 0 | ... | 0 |
| ... | ... | ... | ... | ... | ... | ... | ... | ... |

FIG.4

NON-SORTED INDEX FILE ID : 0

| WRITING KEYWORD, HEAD KEYWORD | ENTRY WORD | TEXT FILE ID | ANCHOR NAME |
|---|---|---|---|
| ア | あ（音節） | 0 | a00002002 |
| 足, アシ | あし [足] | 0 | a000020e8 |
| ... | ... | ... | ... |
| アーティキュレーション | アーティキュレーション [<small>articulation</small>] | 1 | a00016042 |
| ... | ... | ... | ... |
| アイーアイ | アイーアイ [<small>aye aye</small>] | 1 | ai101 |
| ... | ... | ... | ... |
| 馬耳念仏, ウマノミミニネンブツ | 馬の耳に念仏 | 203 | a0090163 |

F0

NON-SORTED INDEX FILE ID : i

| WRITING KEYWORD, READING KEYWORD | ENTRY WORD | TEXT FILE ID | ANCHOR NAME |
|---|---|---|---|
| 馬耳念仏, ウマノミミニネンブツ | 馬の耳に念仏 | 203 | a0090163 |
| ... | ... | ... | ... |
| 国際環境会議, コクサイカンキョウカイギ | 国際環境会議 | 505 | a05050246 |
| ... | ... | ... | ... |
| 環境破壊, カンキョウハカイ | 環境破壊 | 508 | a5080978 |
| ... | ... | ... | ... |

Fi

NON-SORTED INDEX FILE ID : n

| WRITING KEYWORD, READING KEYWORD | ENTRY WORD | TEXT FILE ID | ANCHOR NAME |
|---|---|---|---|
| ... | ... | ... | ... |

Fn

103

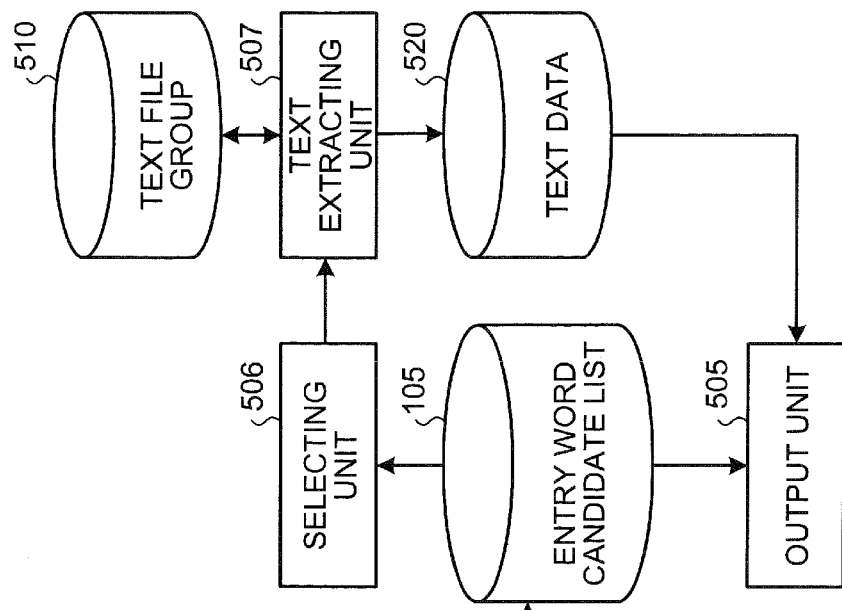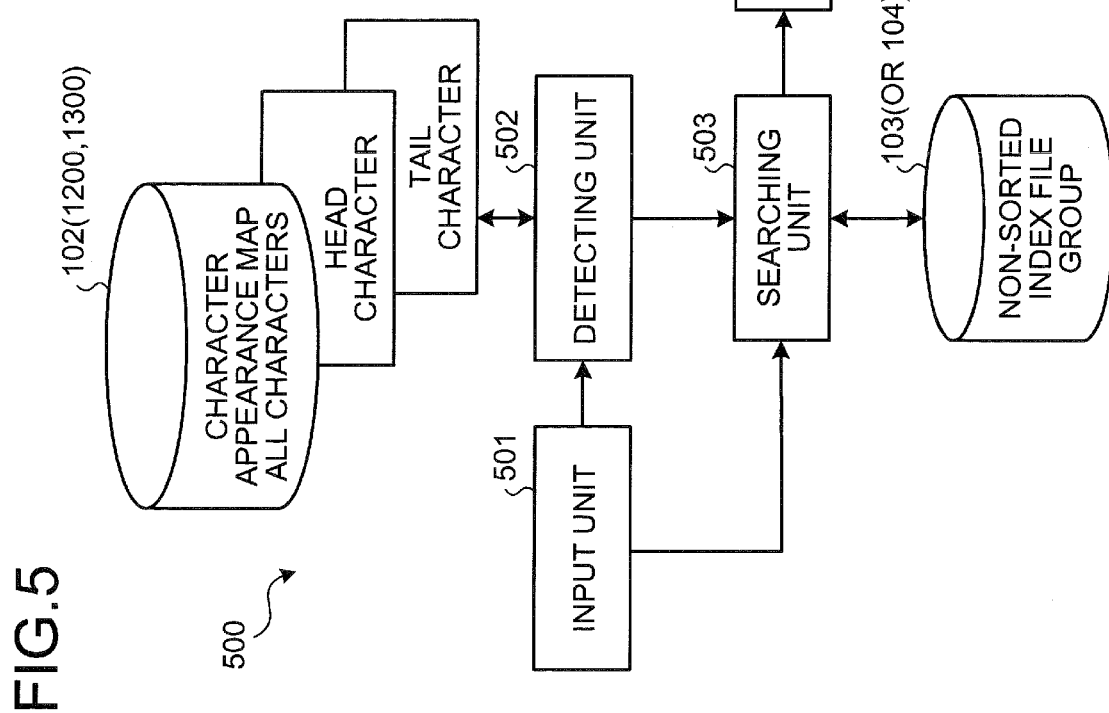
FIG.5

| ENTRY WORD HEAD CHARACTER | NON-SORTED INDEX FILE ID | | | | | | | |
|---|---|---|---|---|---|---|---|---|
| | 0 | 1 | 2 | 3 | ... | i | ... | n |
| ... | ... | ... | ... | ... | ... | ... | ... | ... |
| 会 | 0 | 1 | 0 | 0 | ... | 0 | ... | 0 |
| ... | ... | ... | ... | ... | ... | ... | ... | ... |
| 壊 | 0 | 0 | 0 | 0 | ... | 0 | ... | 0 |
| ... | ... | ... | ... | ... | ... | ... | ... | ... |
| 環 | 1 | 0 | 0 | 0 | ... | 1 | ... | 0 |
| ... | ... | ... | ... | ... | ... | ... | ... | ... |
| 議 | 0 | 0 | 0 | 0 | ... | 0 | ... | 0 |
| ... | ... | ... | ... | ... | ... | ... | ... | ... |
| 境 | 0 | 0 | 0 | 0 | ... | 0 | ... | 0 |
| ... | ... | ... | ... | ... | ... | ... | ... | ... |
| 国 | 0 | 0 | 0 | 1 | ... | 1 | ... | 0 |
| ... | ... | ... | ... | ... | ... | ... | ... | ... |
| 際 | 0 | 0 | 0 | 0 | ... | 0 | ... | 0 |
| ... | ... | ... | ... | ... | ... | ... | ... | ... |
| 破 | 0 | 0 | 0 | 0 | ... | 0 | ... | 0 |
| ... | ... | ... | ... | ... | ... | ... | ... | ... |

| ENTRY WORD TAIL CHARACTER | NON-SORTED INDEX FILE ID | | | | | | | |
|---|---|---|---|---|---|---|---|---|
| | 0 | 1 | 2 | 3 | ... | i | ... | n |
| ... | ... | ... | ... | ... | ... | ... | ... | ... |
| 会 | 0 | 1 | 0 | 0 | ... | 0 | ... | 0 |
| ... | ... | ... | ... | ... | ... | ... | ... | ... |
| 壊 | 0 | 0 | 0 | 0 | ... | 1 | ... | 0 |
| ... | ... | ... | ... | ... | ... | ... | ... | ... |
| 環 | 0 | 0 | 0 | 0 | ... | 0 | ... | 0 |
| ... | ... | ... | ... | ... | ... | ... | ... | ... |
| 議 | 0 | 0 | 0 | 0 | ... | 1 | ... | 0 |
| ... | ... | ... | ... | ... | ... | ... | ... | ... |
| 境 | 0 | 0 | 0 | 0 | ... | 0 | ... | 0 |
| ... | ... | ... | ... | ... | ... | ... | ... | ... |
| 国 | 0 | 0 | 0 | 0 | ... | 0 | ... | 1 |
| ... | ... | ... | ... | ... | ... | ... | ... | ... |
| 際 | 0 | 0 | 0 | 0 | ... | 0 | ... | 0 |
| ... | ... | ... | ... | ... | ... | ... | ... | ... |
| 破 | 0 | 0 | 0 | 0 | ... | 0 | ... | 0 |
| ... | ... | ... | ... | ... | ... | ... | ... | ... |

INFORMATION SEARCH APPARATUS, AND INFORMATION SEARCH METHOD, AND COMPUTER PRODUCT

This application is a Continuation of International Application No. PCT/JP2007/051069, filed Jan. 24, 2007.

FIELD

The embodiments discussed herein are related to a recording medium that stores an information search program, an information search apparatus, and an information search method.

BACKGROUND

Conventionally, in dictionary content such as a dictionary and a dictionary of terminology, many entries are constituted by a phrase (multiple segments) such as "国際環境会議" : International Conference on Environment ("国際" : international/ "環境" : environment/"会議" : conference)". Moreover, in search processing, in addition to kanji, candidates are narrowed down by further input of multiple (two to three, for example) keyword character strings in hiragana and katakana, i.e., "kana" syllabic Japanese scripts, (for example, see Japanese Patent Laid-Open Publication No. 2005-158044).

The technique disclosed in the patent document above enables searches for a multi-segment entry, searches using a character string that includes kanji and kana, searches using variant characters, and searches for a loanword to be performed. Specifically, in addition to kanji, keywords in katakana/kana are recorded, and the keywords in kanji, kana, and the like are sorted according to character code. Furthermore, to speed up the search, a superiority index based on a head character is created to form a hierarchical index.

Moreover, with respect to katakana/kana keyword searches, processing to handle voiced consonants/semi-voiced consonants, contracted sounds/double consonants, long vowels is performed. Concerning character string searches including kana and kanji, processing to delete kana characters is performed and in variant character searches, orthographic conversion processing is performed. Further, for loanword searches, for example in the case of "violin" which is expressed as "バイオリン" or "ヴァイオリン", conversion processing to search under "ゾ\" in the kana syllabary is performed.

However, the technique (sorted index for multi-segment entry searches) disclosed in the above patent document has a problem in that in search for an entry constituted by multiple segments, the number of hits is incorrect with respect to the limited number of candidates in a list.

For example, when a multi-segment keyword, "馬の耳に念仏" is searched for, if search keywords of "馬" (horse) "耳" (ear), and "念仏" (prayer) are input, and if a maximum of 10 retrieval candidates are held in a buffer of each search keyword, 10 items for "馬", 10 items for "耳", and 10 items for "念仏" are retrieved by a search performed in the order of character code.

However, if "馬の耳に念仏", is the eleventh or a subsequent candidate when searched according to the respective keywords, the entry of "馬の耳に念仏", will not be included among the 30 items retrieved. Consequently, the search result for candidates is indicated as 0 hits, i.e., the number of hits that is displayed is incorrect.

In addition, as the number of entries of a dictionary increases (for example, Kojien, Fifth Edition, has 230,000 entries), the number of items that meet respective search keywords increases, and consequently, the problem of the number of hits being incorrectly indicated as 0 occurs often.

Moreover, the number of scannings of the superiority index file based on a head character of a multi-segment entry increases corresponding to the number of search keywords. Therefore, as the number of search keywords increases, the more search time is required.

If the number of search keywords is decreased, the candidates are not sufficiently narrowed down, and the number of retrieval candidates increases. As a result, there is a problem in that a large memory capacity is required to store a longer list of retrieval candidates. On the other hand, if many search keywords are used, a large memory capacity to store the search keywords is required since a buffer is prepared for each of the search keywords.

SUMMARY

According to an aspect of the present invention, a computer-readable recording medium stores therein an information search program that causes a computer to search for text described in a text file. The information search program causes the computer to execute receiving input of a search keyword; searching an index file for a writing keyword that includes the search keyword, the index file including writing keywords described, for respective entries, in an order identical to the order in which the text is described in the text file; identifying an entry that corresponds to the writing keyword retrieved at the searching; and outputting the identified entry.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a schematic diagram of a non-sorted index file group depicted in FIG. 1;

FIG. 5 is a functional diagram of the information search apparatus according to the first embodiment;

FIG. 12 is a schematic diagram of a head character appearance map;

FIG. 13 is a schematic diagram of a tail character appearance map;

DESCRIPTION OF EMBODIMENTS

Preferred embodiments of the present invention will be explained with reference to the accompanying drawings.

Figure 1:
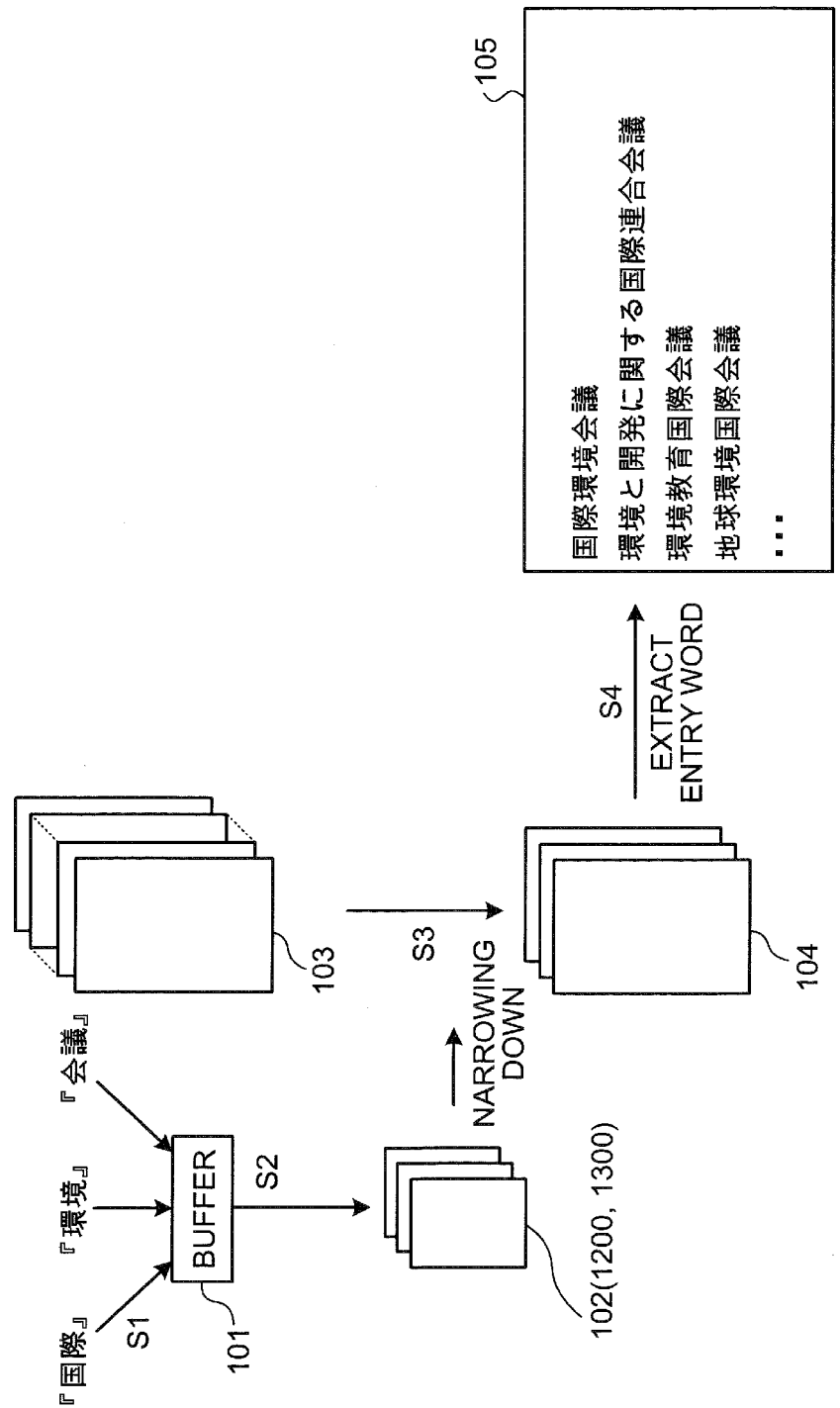
FIG. 1 is a schematic diagram of an outline of a first embodiment of the present invention.

FIG. 1 is a schematic diagram of an outline of information search processing of a recording medium that stores an information search program, an information search apparatus, and an information search method according to a first embodiment of the present invention.

As depicted in FIG. 1, search keywords, e.g., "国際" (international), "環境" (environment), "会議" (conference) are input and stored in a buffer 101 (S1). As necessary, a character appearance map 102 is used to identify a non-sorted index file that includes all characters "国", "際", "環", "境", "会", "議" constituting the search keywords (S2). The character appearance map 102 includes, for each non-sorted index file, bit information of flags respectively indicating whether a given character is present. A flag is provided for each character.

A non-sorted index file 104 that includes all of the search keywords is extracted from a non-sorted index file group 103 as a result of narrowing down (S3). From the non-sorted index file (result of narrowing down) 104, a multi-segment entry that includes all of the search keywords is extracted as a retrieval candidate (S4) thereby obtaining an entry candidate list 105. Details of the character appearance map 102 and the non-sorted index file group 103 are described later.

Figures 2, 3:
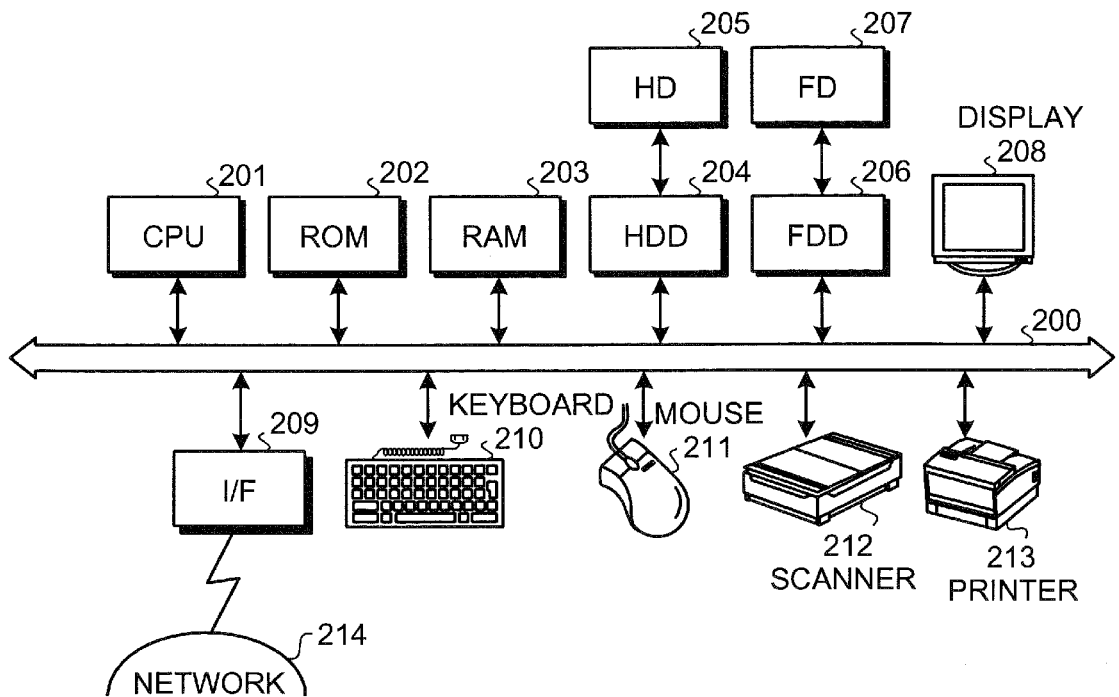
FIG. 2 is a block diagram of an information search apparatus according to the first embodiment of the present invention.
FIG. 3 is a schematic diagram of a character appearance map depicted in FIG. 1.

FIG. 2 is a block diagram of an information search apparatus according to the first embodiment of the present invention. As depicted in FIG. 2, the information search apparatus includes a central processing unit (CPU) 201, a read-only memory (ROM) 202, a random access memory (RAM) 203, a hard disk drive (HDD) 204, a hard disk (HD) 205, a flexible disk drive (FDD) 206, a flexible disk (FD) 207 as an example of a removal recording medium, a display 208, an interface (I/F) 209, a keyboard 210, a mouse 211, a scanner 212, and a printer 213, connected to one another by way of a bus 200.

The CPU 201 governs overall control of the information search apparatus. The ROM 202 stores therein programs such as a boot program. The RAM 203 is used as a work area of the CPU 201. The HDD 204, under the control of the CPU 201, controls the reading and the writing of data with respect to the HD 205. The HD 205 stores therein the data written under control of the HDD 204.

The FDD 206, under the control of the CPU 201, controls the reading and the writing of data with respect to the FD 207. The FD 207 stores therein the data written under control of the FDD 206, the data being read by the information search apparatus.

In addition to the FD 207, a removable recording medium may include a compact disc read-only memory (CD-ROM), compact disc-recordable (CD-R), a compact disc-rewritable (CD-RW), a magneto optical disc (MO), a Digital Versatile Disc (DVD), a memory card, etc. The display 208 displays a cursor, an icon, a tool box, and data such as document, image, and function information. The display 208 may be, for example, a cathode ray tube (CRT), a thin-film-transistor (TFT) liquid crystal display, or a plasma display.

The I/F 209 is connected to a network 214 such as the Internet through a communications line and is connected to other devices by way of the network 214. The I/F 209 administers an interface with the network 214, and controls the input and output of data from/to external devices. The I/F 209 may be, for example, a modem or a local area network (LAN) adapter.

The keyboard 210 is equipped with keys for the input of characters, numerals, and various instructions, and data is entered through the keyboard 210. The keyboard 210 may be a touch-panel input pad or a numeric keypad. The mouse 211 performs cursor movement, range selection, and movement, size change, etc., of a window. The mouse 211 may be a trackball or a joystick provided the trackball or joystick has similar functions as a pointing device.

The scanner 212 optically reads an image and takes in the image data into the information search apparatus. The scanner 212 may have an optical character recognition (OCR) function as well. The printer 213 prints image data and document data. The printer 213 may be, for example, a laser printer or an ink jet printer.

FIG. 3 is a schematic diagram of the character appearance map depicted in FIG. 1. As depicted in FIG. 3, the character appearance map 102 has a row of flags for each character, the flags being arranged in an ascending order of file identification (ID) (i=0 to n) of the non-sorted index files. A flag value of "1" indicates that the character is present in the non-sorted index file of the corresponding file ID.

On the other hand, a flag value of "0" indicates that the character is not present in the non-sorted index file of the corresponding file ID. For example, according to the row of flags for the character "あ", the character "あ" is present in the non-sorted index files having the file IDs of 0 and 3. The character appearance map is recorded on a recording medium such as the RAM 203 and the HD 205 depicted in FIG. 2, and is read therefrom as necessary.

FIG. 4 is a schematic diagram of the non-sorted index file group depicted in FIG. 1. As depicted in FIG. 4, the non-sorted index file group 103 is a group of n+1 non-sorted index files F0 to Fn.

Each non-sorted index file (hereinafter, also referred to as simply "index file") Fi holds a writing keyword (including a keyword concerning reading if necessary. If the keyword concerning reading is included, it is described as "writing keyword, etc."). The writing keyword is the kanji writing of a search keyword that is input when an entry is searched for. For example, when the entry is "国際環境会議" in the file Fi, the writing keyword is "国際環境会議" in kanji. Furthermore, a keyword concerning the reading "コクサイカンキョウカイギ" in kana may be recorded as necessary. The keyword concerning reading may be described in hiragana or katakana.

If an entry is a character string including both kana and kanji such as "馬の耳に念仏", a writing keyword that is obtained by performing kana-suppression processing is recorded. The kana-suppression processing is processing of deleting kana characters that are isolated in the character string. If the entry "馬の耳に念仏", is subjected to the kana-suppression processing, characters "に" and "の" are deleted, and a writing keyword "馬耳念仏" is obtained. In this case, the keyword concerning reading is not reading of the character string "馬耳念仏" (uma mimi nenbutsu) obtained after the kana-suppression processing, but reading (ウマノミミニネンブツ (uma no mimi ni nenbutsu)) of the entry "馬の耳に念仏",.

In the index file Fi, entries corresponding to writing keywords, etc., text file IDs, and anchor names are also recorded. The text file ID is a file ID of a text file in which main text such as explanation of an entry and the like are included. The anchor name is information indicating a position at which the main text appears in the text file of a corresponding file ID. By the text file ID and the anchor name, main text of an entry can be pointed to.

The entry, the text file ID, and the anchor name may be recorded in a file (entry file) different from the index file Fi as long as linked with the writing keyword, etc. However, as depicted in FIG. 4, if an integrated file is created with the writing keyword, pointing to an entry is not necessary, and therefore, the search speed can be improved.

Moreover, this index file Fi is a non-sorted index file in which writing keywords are not sorted sequentially according to character code, but recorded in order of entry items. This enables retrieval candidates to be hit according to listed entries, and therefore, the search speed can be improved.

Furthermore, because the index files Fi have no hierarchical relation therebetween, pointing from a superior index to an inferior index is not necessary as in the technique disclosed in the patent document described above. Therefore, the scan processing of the index files Fi can be performed at a higher speed. The non-sorted index file group 103 is recorded on a recording medium such as the RAM 203 and the HD 205 depicted in FIG. 2, and is read therefrom as necessary.

FIG. 5 is a functional diagram of the information search apparatus according to the first embodiment. As depicted in FIG. 5, an information search apparatus 500 includes a text file group 510, an input unit 501, a detecting unit 502, a searching unit 503, an identifying unit 504, a selecting unit 506, an output unit 505, and a text extracting unit 507.

The text file group 510 is a group of text files in which main text (explanation) concerning an entry are included. The text file group 510 is recorded on a recording medium such as the RAM 203 and the HD 205 depicted in FIG. 2, and is read therefrom as necessary.

The input unit 501 has a function of receiving input of a search keyword. Specifically, input is received of a search keyword made by a user by operating an input device such as the keyboard 210 and the mouse 211 depicted in FIG. 2, and stored in a recording medium such as the RAM 203 and the HD 205 and is read therefrom as necessary. The number of search keywords to be input may be one or more than one. Furthermore, when more than one search keyword is input, the number thereof is not limited. This function corresponds to processing S1 depicted in FIG. 1.

The detecting unit 502 has a function of detecting an index file in which all characters that constitute the search keyword are included, based on the character appearance map 102 having a row of flags that indicate whether a character is present in each of the non-sorted index files Fi, a row of flags being provided for each character. Specifically, a search keyword that is received by the input unit 501 and stored in a recording medium such as the RAM 203 and the HD 205 is broken down into respective characters, and an index file in which all flags of the respective characters are "1" is detected.

For example, when the search keywords are "国際", "環境", and "会議", as depicted in FIG. 3, the index file Fi whose file ID is i in which all flags of characters "国", "際", "環", "鏡", "会", and "議" are set to "1" is detected. As described, by detecting an index file that includes all characters that constitute search keywords prior to entry search, index files to be subjects of entry search can be narrowed down. Therefore, efficiency of entry search can be improved. This function corresponds to processing S2 and processing S3 depicted in FIG. 1.

The searching unit 503 has a function of searching the index file group 103 or the index file 104 that result from narrowing down, to find a writing keyword that includes a search keyword. Specifically, when the detecting unit 502 is not used, the index file group 103 that has not been narrowed down is searched for a writing keyword that includes the search keyword. On the other hand, when the detecting unit 502 is used, the index file 104 that is detected is searched for a writing keyword that includes the search keyword.

Furthermore, to improve the efficiency of the search processing, when multiple search keywords are present, writing keywords (as well as a keyword concerning reading when included; hereinafter, referred to as "writing keyword, etc.") including one search keyword are first detected from the index file. Subsequently, search keywords other than the one search keyword are detected among the detected writing keywords, etc.

In other words, when the search for the other search keywords is performed, the search is performed by searching in the writing keywords, etc. that are hit in the search for the one search keyword, not by searching all the index files starting from the index file F0.

When all the search keywords are detected in a writing keyword, etc., the writing keyword, etc. is recorded in a recording medium such as the RAM 203 and the HD 205. Thereafter, the writing keyword, etc. on a subsequent line is to be the subject of search, and search is performed in a similar manner. On the other hand, when there is no hit with any one of the search keywords, upon finding such a result, the writing keyword, etc. on a subsequent line is to be the subject of search, and search is performed in a similar manner.

Therefore, the scanning frequency of the index file group 103 and 104 is not dependent on the number of search keywords, and the index file group 103 and 104 are scanned only once. This enables to improve the efficiency of the search processing for writing keyword, etc.

Figure 6:
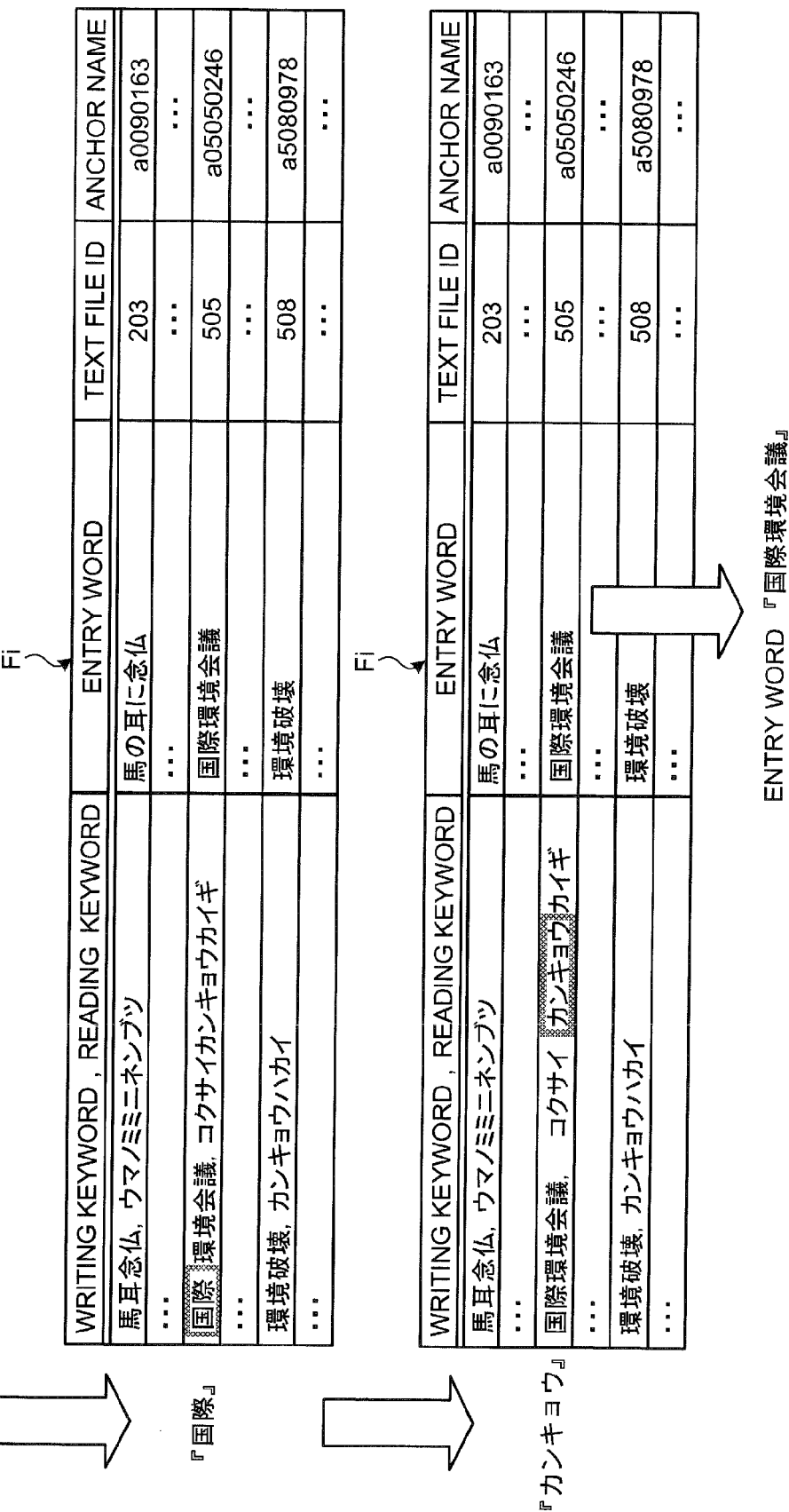
FIG. 6 is a schematic diagram for explaining an example of search processing performed by a searching unit.

FIG. 6 is a schematic diagram for explaining an example of the search processing performed by the searching unit 503. In the example depicted in FIG. 6, when "国際" in kanji and "カンキョウ" in katakana are input as a search keyword 600, first, scanning is performed using the search keyword "国際" from the index file F0. As depicted in FIG. 6, the search keyword "国際" coincides with "国際" in a writing keyword, etc. "国際環境会議" "コクサイカンキョウカイギ" in the index file Fi.

Next, without scanning the index file F0 to search for the search keyword "カンキョウ" but rather by searching among the writing keywords, etc. that are hit in the search for the search keyword "国際" the next search keyword "カンキョウ" is searched for. The search keyword "カンキョウ" coincides with "カンキョウ" in the writing keyword, etc. "国際環境会議" "コクサイカンキョウカイギ".

As for a writing keyword, etc. "環境破壊, カンキョウハカイ", because the search keyword "国際" is not included therein, it is excluded from the search even before the search for the search keyword "カンキョウ" is performed, and a subsequent writing keyword, etc. is checked. This processing corresponds to processing S4 depicted in FIG. 1.

The identifying unit 504 identifies, as an entry candidate, an entry that corresponds to the writing keyword retrieved by the searching unit 503. Specifically, an entry may be identified by reading an entry that is the origin of the writing keyword, etc. stored in the recording medium such as the RAM 203 and the HD 205 from the index file Fi. The identified entry is stored in a recording medium such as the RAM 203 and the HD 205 depicted in FIG. 2.

Reference of the explanation is with respect to FIG. 6. When the search keywords are "国際" in kanji and "国際環境会議" in katakana, an entry "国際環境会議" that is the origin of the writing keyword, etc. "国際環境会議", "コクサイカンキョウカイギ" " to be the retrieval candidate is read as an entry candidate. The read entry candidate is stored in a recording medium such as the RAM 203 and the HD 205 depicted in FIG. 2. When the processing by the identifying unit 504 is finished, the entry candidate list 105 is obtained. This function corresponds to processing S4 depicted in FIG. 1.

Figure 7:
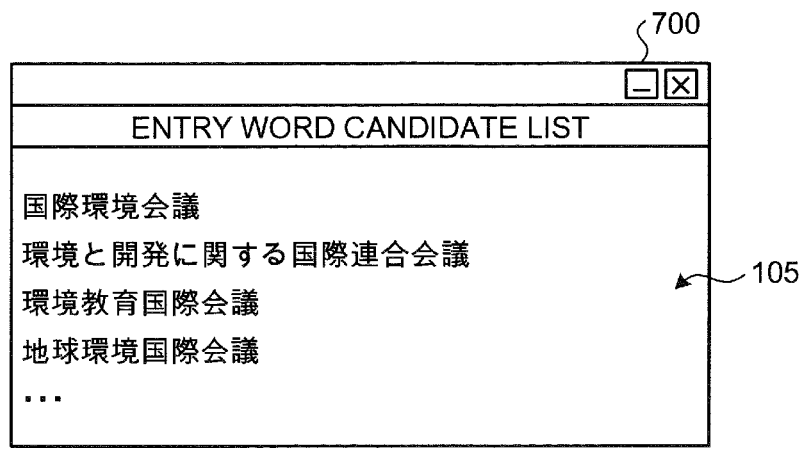
FIG. 7 is a schematic diagram of an entry candidate list that is output by display.

The output unit 505 depicted in FIG. 5 outputs the entry identified by the identifying unit 504. Specifically, the entry candidate list 105 stored in the recording medium such as the RAM 203 and the HD 205 depicted in FIG. 2 is read and output. The form of output may be display output by the display 208 depicted in FIG. 2 or print output by the printer 213. Output may also be sound output. FIG. 7 is a schematic diagram of the entry candidate list 105 that is output by display. In FIG. 7, the entry candidate list 105 is displayed on a display screen 700.

The selecting unit 506 depicted in FIG. 5 receives selection of an arbitrary entry candidate from the entry candidate list 105 output by the output unit 505. For example, when the entry candidate list 105 is displayed on the display screen 700 as depicted in FIG. 7, an arbitrary entry candidate can be selected by operating the keyboard 210 or the mouse 211.

Figure 8:
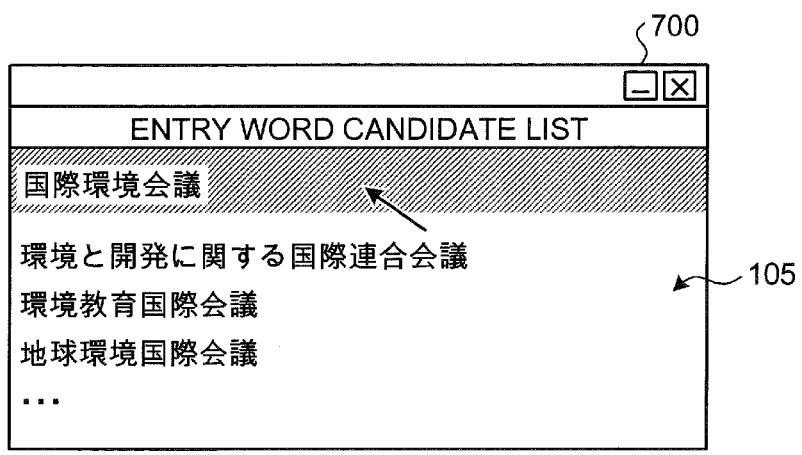
FIG. 8 is a schematic diagram of an example of selection of an entry candidate.

FIG. 8 is a schematic diagram of an example of selection of an entry candidate. FIG. 8 depicts an example in which selection of the entry candidate "国際環境会議" from the entry candidate list 105 displayed on the display screen 700 is received.

The text extracting unit 507 depicted in FIG. 5 identifies, as the entry and from the text file group 510, a text file having the entry candidate selected via the selecting unit 506. The text extracting unit 507 then extracts text data 520 including the entry (candidate) and explanation therefor from the identified text file. Because the text file ID and the anchor name are recorded in the index file for the selected entry candidate, by using the text file ID and the anchor name as pointers, the text data of the selected entry candidate is extracted.

Figure 9:
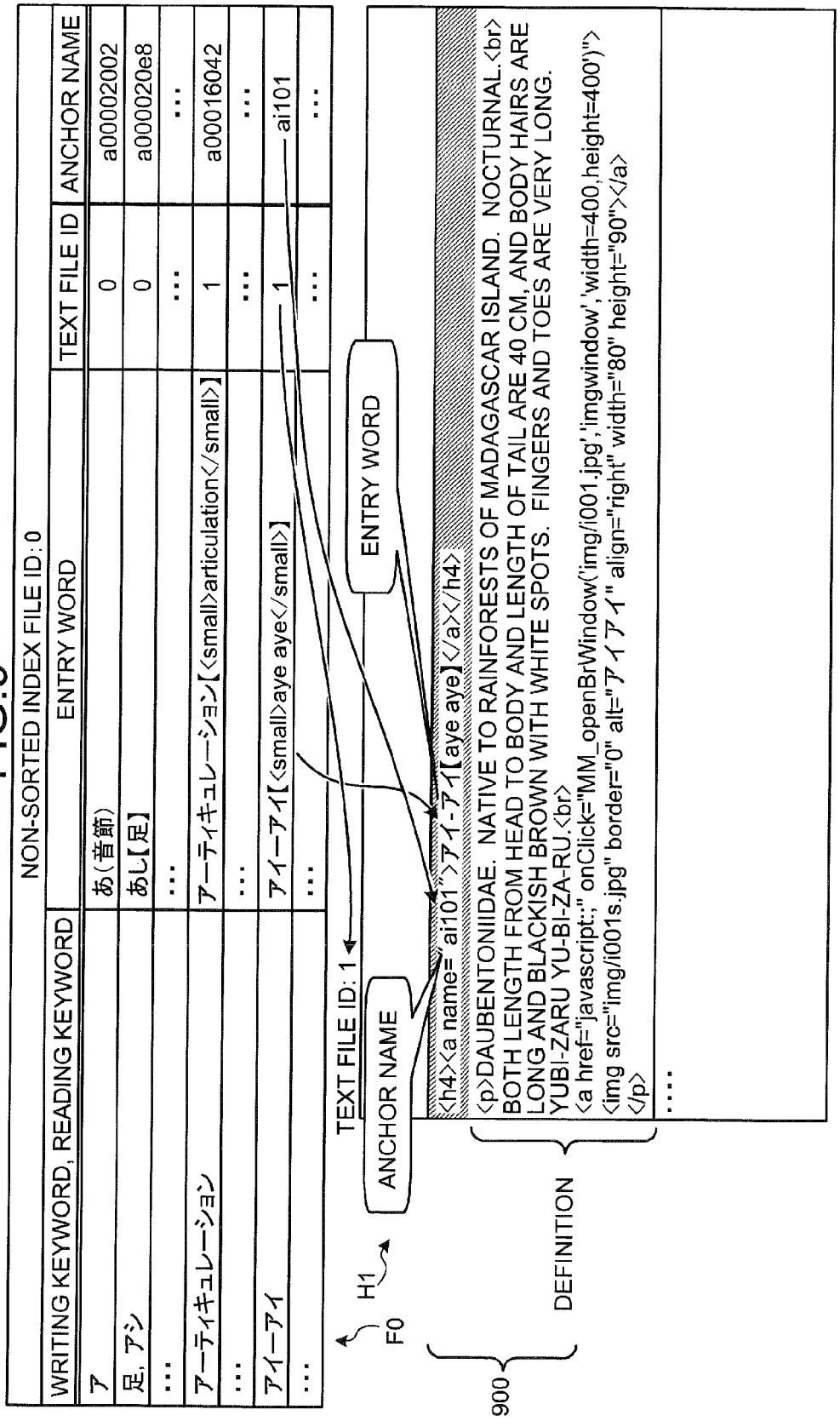
FIG. 9 is a schematic diagram for explaining an example of extraction of text data.

FIG. 9 is a schematic diagram for explaining an example of extraction of text data. When the entry candidate is "アイアイ [<small>aye aye</small>]", by a pointing to the text file ID: 1 described in the index file F0, a text file H1 can be extracted from the text file group 510.

Further, by a pointing to the anchor name "ai101" described in the index file F0, a position at which text data 900 including the entry and the explanation appears can be identified, and the text data 900 is extracted. The output unit 505 outputs the extracted text data 900 in a similar manner as the entry candidate list 105.

The functions of the input unit 501, the detecting unit 502, the searching unit 503, the identifying unit 504, the selecting unit 506, the output unit 505, and the text extracting unit 507 are implemented by the CPU 201 executing a computer program that is recorded on a recording medium such as the ROM 202, the RAM 203, and the HD 205 depicted in FIG. 2, or by the I/F 209.

Figure 10:
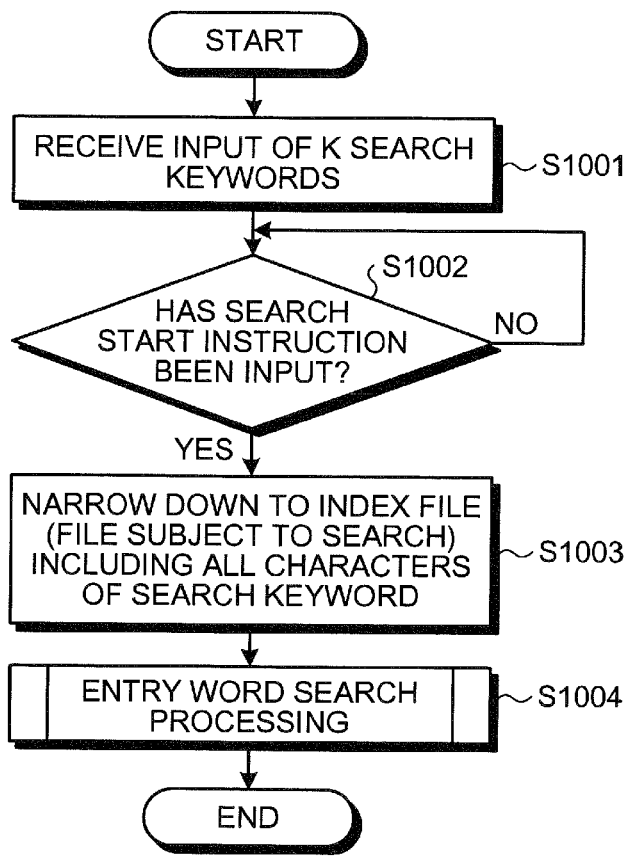
FIG. 10 is a flowchart of information search processing according to the first embodiment.

FIG. 10 is a flowchart of information search processing according to the first embodiment. As depicted in FIG. 10, the input unit 501 receives input of K (K≥1) search keywords (step S1001), and waits for input of search start instruction (step S1002: NO).

When the input of search start instruction is received (step S1002: YES), the detecting unit 502 narrows down the index file group 103 into the index file 104 including all characters that constitute the search keyword(s), based on the character appearance map 102 (step S1003). The index file 104 thus obtained is regarded as a file subject to search. The entry search processing is performed with respect to the index file 104 (step S1004).

Figure 11:
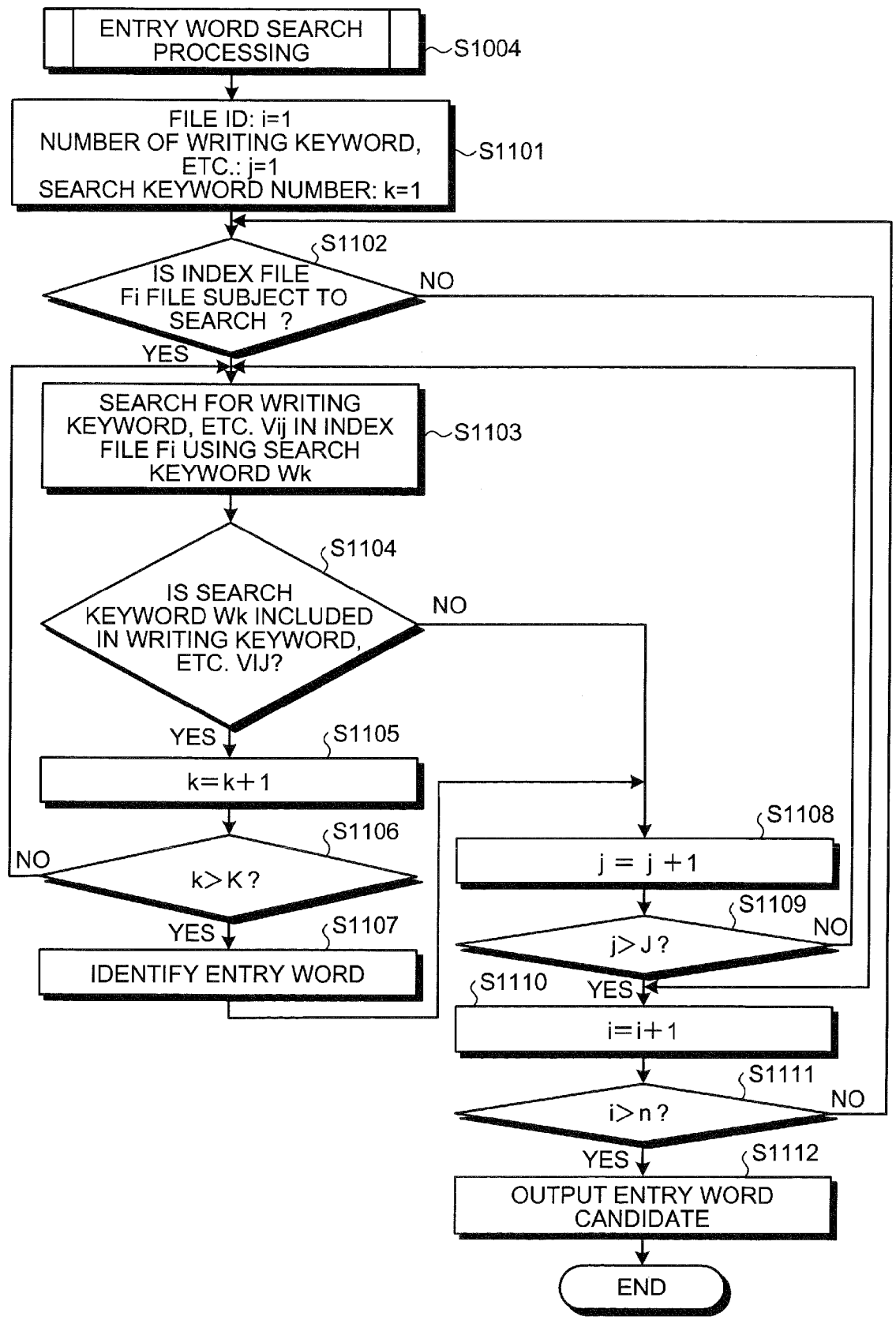
FIG. 11 is a flowchart entry search processing (step S1004) depicted in FIG. 10.

FIG. 11 is a flowchart the entry search processing (step S1004) depicted in FIG. 10. First, the file ID: i of the index file group 103 is set to i=0, number j writing keyword, etc. is set to j=1, and search keyword number k is set to k=1 (step S1101).

The number j writing keyword, etc. is an ID that identifies a writing keyword, etc. included in the respective index file Fi. In each of the index files Fi, a maximum of J writing keywords, etc. are recorded (e.g., J=512). Hereinafter, a writing keyword, etc. corresponding to the number j writing keyword, etc. in the index file Fi is referred to as "writing keyword, etc. Vij".

Moreover, the search keyword number is the number assigned to an input search keyword and is assigned in an ascending order from the head as k=1, k=2, . . . . For example, when the search keywords are input in the order of "国際", "環境", "会議" k=1, k=2, k=3 are assigned to "国際", "環境" ", ""会議" ", respectively. Hereinafter, the search keyword corresponding to the search keyword number k is referred to as "search keyword Wk".

Next, it is determined whether the index file Fi is a file subject to search (step S1102). Because the index file group 103 has been narrowed down to a file subject to search (the index file 104) having all characters that constitute search keywords W1 to Wk, if the index file Fi is an index file other than the file subject to search (step S1102: NO), the process proceeds to step S1110, and the file ID: i is incremented.

On the other hand, when the index file Fi is the file subject to search (step S1102: YES), the search keyword Wk is searched for in the writing keyword, etc. Vij of the index file Fi (step S1103). When the search keyword Wk is not included in the writing keyword, etc. Vij (step S1104: NO), the process proceeds to step S1108, and the number j is incremented.

On the other hand, when the search keyword Wk is included in the writing keyword, etc. Vij (step S1104: YES), the search keyword number k is incremented (step S1105) and it is determined whether k>K (step S1106). K is the number of the search keywords.

When k is not k>K (step S1106: NO), the process returns to step S1103, and the search is performed. On the other hand, when k>K (step S1106: YES), an entry that is the origin of the writing keyword, etc. Vij is identified (extracted) as an entry candidate (step S1107). The process then proceeds to step S1108.

At step S1108, the number j writing keyword, etc. is incremented. It is then determined whether j>J (step S1109). J is the quantity of the writing keywords, etc. included in the index file Fi. When it is not j>J (step S1109: NO), the process returns to step S1103, and the search is performed. On the other hand, when j>J (step S1109: YES), it is determined that the search in the index file Fi is finished, and the process proceeds to step S1110.

At step S1110, the file ID: i is incremented. It is then determined whether i>n (step S1111). When i is not i>n (step S1111: NO), the process returns to step S1102, and it is determined whether the index file Fi is a file subject to search. On the other hand, when i>n (step S1111: YES), the entry candidate list 105 that is a group of entries identified at step S1107 is output (step S1112). Thus, a series of the entry search processing is ended.

As described in the first embodiment, the number of hits in a candidate list in the search for an entry that is constituted by multiple segments can be output correctly. In addition, limits on the quantity of input search keywords can be removed, and a narrowing down search can be facilitated.

Furthermore, in the scanning (searching) of the index file Fi, when one search keyword hits one writing keyword, etc., a search for the other search keywords can be performed with respect to the writing keyword, etc. thereafter. Therefore, the search speed can be improved and the required memory capacity can be reduced. Moreover, files subject to search can be narrowed down using the character appearance map 102 prior to the entry search processing. Therefore, the search speed can be improved.

Furthermore, if the index file group 102 is compressed using a compression parameter (for example, Huffman tree) and the search keyword is also compressed by the compression parameter, the entry search can be achieved in a compressed state. In this method, by expanding only the hit index file Fi (or corresponding block data therein), the entry candidate list 105 can be created.

By thus compressing the index file group 103, further reduction of the memory can be achieved. Furthermore, by encoding/decoding the compression parameter by an exclusive OR (XOR) using a predetermined master key, security can be improved.

Next, an outline of information search processing of a recording medium that stores an information search program, an information search apparatus, and an information search method according to a second embodiment of the present invention is explained. In the first embodiment, because the character appearance map 102 is used to narrow down entries, the first embodiment is effective for narrowing down search. In the second embodiment, forward search, reverse search, and full-text search can be speeded up. For example, when a search keyword starts or ends with one character (particularly, one kana character), the search can be achieved at a higher speed than the case of the first embodiment. In the second embodiment, explanation overlapping with the first embodiment is omitted.

In the second embodiment, to speed up the forward search, the reverse search, and the full-text search, in addition to the character appearance map 102 depicted in FIG. 3, two kinds of character appearance maps that are different from the character appearance map 102 are used.

FIG. 12 is a schematic diagram of a head character appearance map. While the character appearance map 102 indicates whether characters that constitute a writing keyword, etc. are present in each of the index files Fi, a head character appearance map 1200 indicates whether a character is present as a head character of a writing keyword, etc. This head character appearance map 1200 has a row of flags for each character, similarly to the character appearance map 102.

Flags constituting a flag row are arranged in ascending order of the file ID (i=1 to n) of non-sorted index files, and a flag value of "1" indicates that the character is present in the non-sorted index file of the file ID as a head character of the writing keyword, etc.

For example, because "国際環境会議" and "環境破壊" are recorded as writing keywords, etc. in the index file Fi depicted in FIG. 4, flags of the head characters "国" and "環" of the index file Fi are set to "1" in the head character appearance map 1200.

FIG. 13 is a schematic diagram of a tail character appearance map. While the character appearance map 102 indicates whether characters that constitute a writing keyword, etc. are present in each of the index files Fi, a tail character appearance map 1300 indicates whether a character is present as a tail character of a writing keyword, etc. This tail character appearance map 1300 has a row of flags for each character, similarly to the character appearance map 102.

Flags constituting a flag row are arranged in ascending order of the file ID (i=1 to n) of non-sorted index files, and a flag value of "1" indicates that the character is present in the non-sorted index file of the file ID as a tail character of the writing keyword, etc.

For example, because "国際環境会議" and "環境破壊" are recorded as writing keywords, etc. in the index file Fi depicted in FIG. 4, flags of the tail characters "議" and "壊" of the index file Fi are set to "1" in the tail character appearance map 1300.

Therefore, when a forward search is performed in the search of a single-segment entry, the head character appearance map 1200 is used, when a reverse search is performed, the tail character appearance map 1300 is used, and when a full-text search is performed, the head character appearance map 1200 and the tail character appearance map 1300 are used. Further, the character appearance map 102 can be used as necessary. In a partial match search in search of a single-segment entry or narrowing down search in search of multi-segment entry as the case of the first embodiment, the character appearance map 102 is used.

Figure 14:
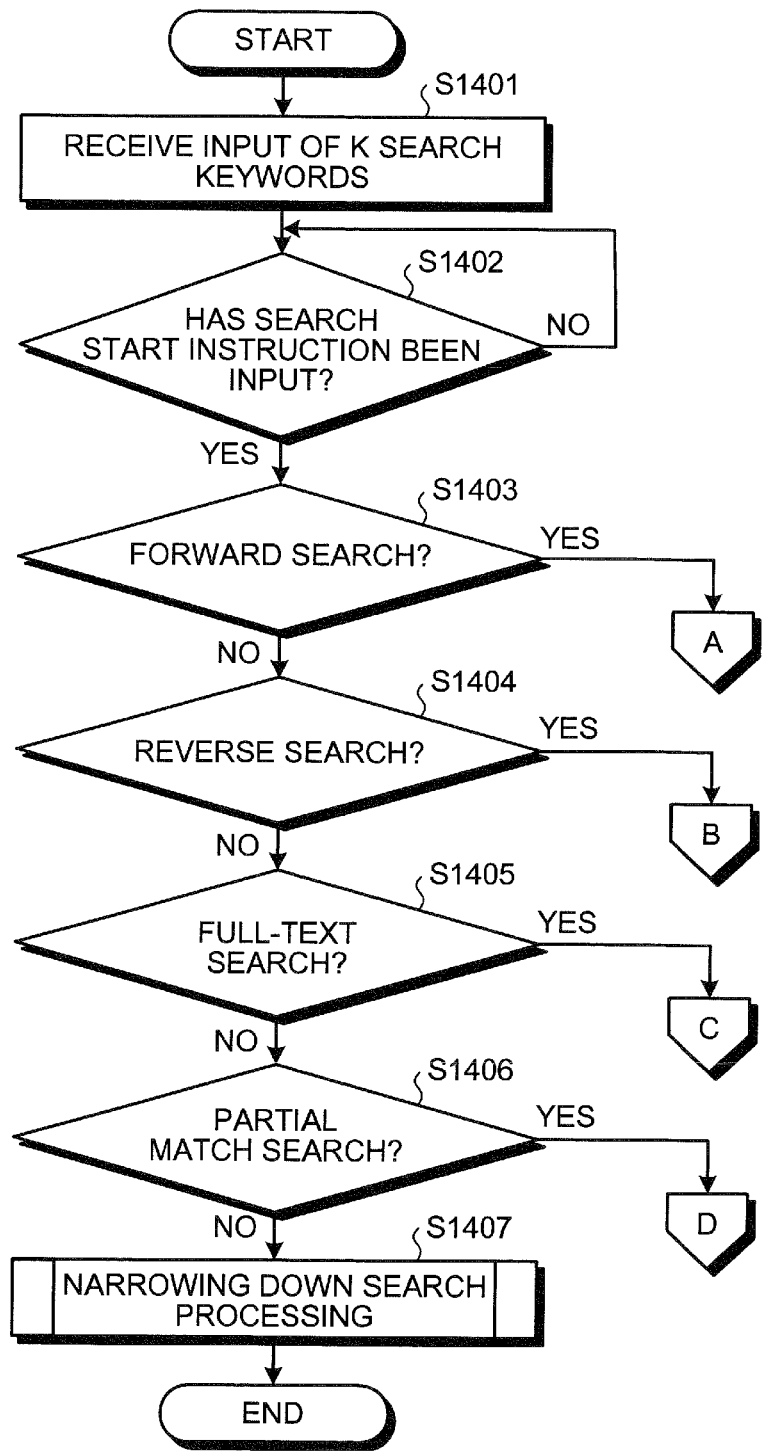
FIG. 14 is a flowchart of information search processing (first half) according to a second embodiment.

FIG. 14 is a flowchart of information search processing (first half) according to a second embodiment.

As depicted in FIG. 14, input of K search keywords is received (step S1401), and waiting occurs until search start instruction is input (step S1402: NO). When the search start instruction is input (step S1402: YES), whether the search is a forward search is determined (step S1403). When the search is a forward search (step S1403: YES), the process proceeds to a flowchart depicted in FIG. 15.

When the search is not a forward search (step S1403: NO), whether the search is a reverse search is determined (step S1404). When the search is a reverse search (step S1404: YES), the process proceeds to a flowchart depicted in FIG. 16.

When the search is not a reverse search (step S1404: NO), whether the search is a full-text search is determined (step S1405). When the search is a full-text search (step S1405: YES), the process proceeds to a flowchart depicted in FIG. 17.

When the search is not a full-text search (step S1405: NO), whether the search is a partial match search is determined. Determination whether the search is a partial match search may be made based on the number of search keywords, specifically. For example, when K=1, the search is for a single-segment entry, and the search is determined as partial match search. On the other hand, when K>1, the search is for a multi-segment entry, and the search is determined as narrowing down search.

When the search is partial match search (step S1406: YES), the process proceeds to a flowchart depicted in FIG. 18. On the other hand, when the search is not partial match search (step S1406: NO), narrowing down search for a multi-segment entry is performed (step S1407). This narrowing down search processing is the same processing as the processing at steps S1103 and S1104 depicted in FIG. 11. Respective flowcharts depicted in FIG. 15 to FIG. 18 are explained below.

Figure 15:
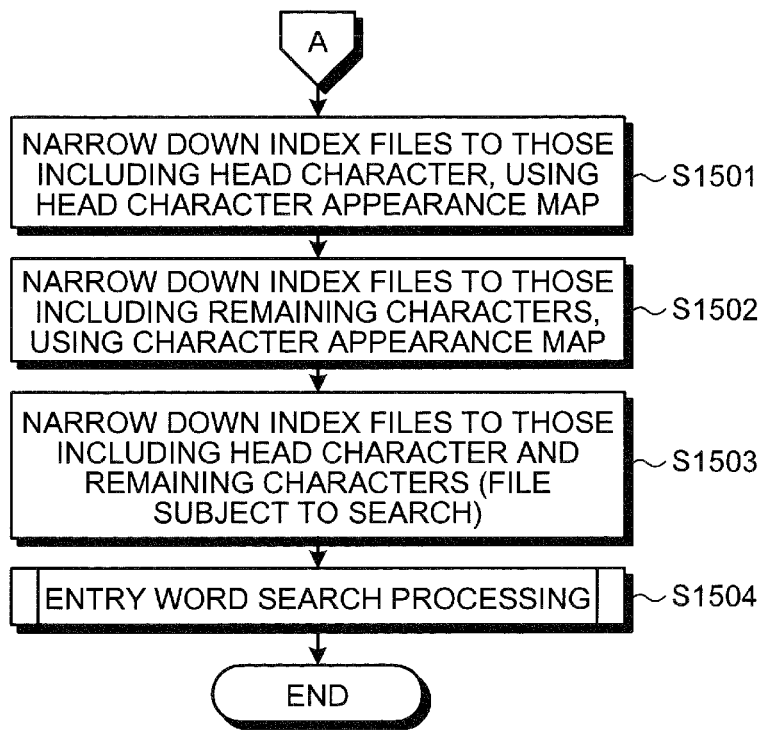
FIG. 15 is a flowchart of information search processing (latter half: forward search)

FIG. 15 is a flowchart of information search processing (latter half: forward search). First, the detecting unit 502 narrows down index files to those that include the head character of a search keyword, using the head character appearance map 1200 (step S1501). Next, the index files are narrowed down to index files that include all remaining characters of the search keyword, using the character appearance map 102 (step S1502).

The index files are then narrowed down to an index file in which the head character and the remaining characters are both present (step S1503). By this processing, an index file that remains after narrowing down at step S1501 and an index file that remains after narrowing down at step S1502 that are one in the same is obtained as a file subject to search.

Thereafter, the searching unit 503 and the identifying unit 504 perform entry search processing using the file subject to search (step S1504). This entry search processing (step S1504) is the same processing as the entry search processing (step S1004) depicted in FIG. 10. Thus, an index file that includes a writing keyword, etc. that matches the head of the search keyword can be obtained, and a forward search for an entry can be speeded up.

Figure 16:
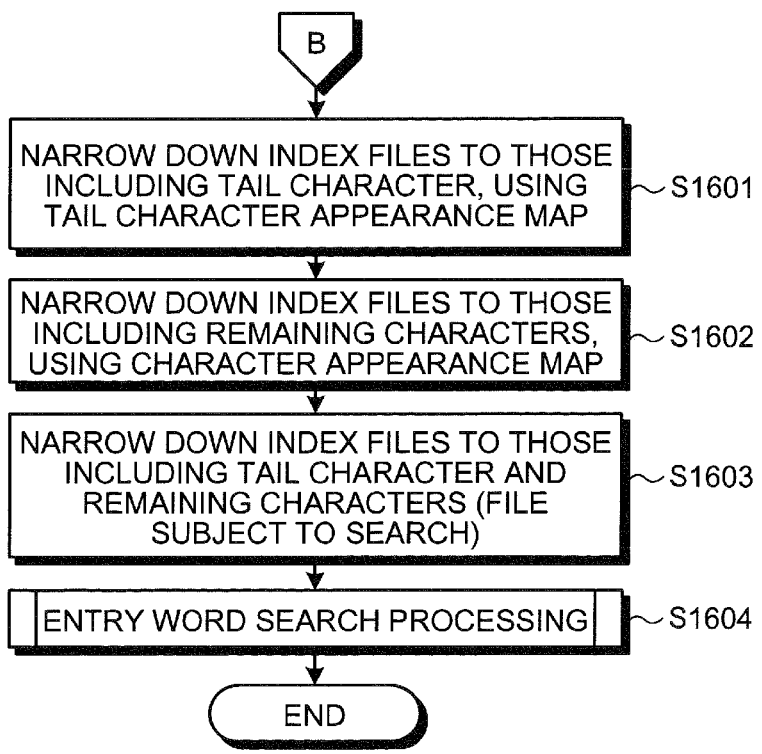
FIG. 16 is a flowchart of information search processing (latter half: reverse search)

FIG. 16 is a flowchart of information search processing (latter half: reverse search). First, the detecting unit 502 narrows down index files to those that include the tail character of a search keyword, using the tail character appearance map 1300 (step S1601). Next, the index files are narrowed down to index files that include all remaining characters of the search keyword, using the character appearance map 102 (step S1602).

The index files are then narrowed down to an index file in which the tail character and the remaining characters are both present (step S1603). By this processing, an index file that remains after narrowing down at step S1601 and an index file that remains after narrowing down at step S1602 that are one in the same is obtained as a file subject to search.

Thereafter, the searching unit 503 and the identifying unit 504 perform entry search processing using the file subject to search (step S1604). This entry search processing (step S1604) is the same processing as the entry search processing (step S1004) depicted in FIG. 10. Thus, an index file that includes a writing keyword, etc. that matches the tail of the search keyword can be obtained, and a reverse search for an entry can be speeded up.

Figure 17:
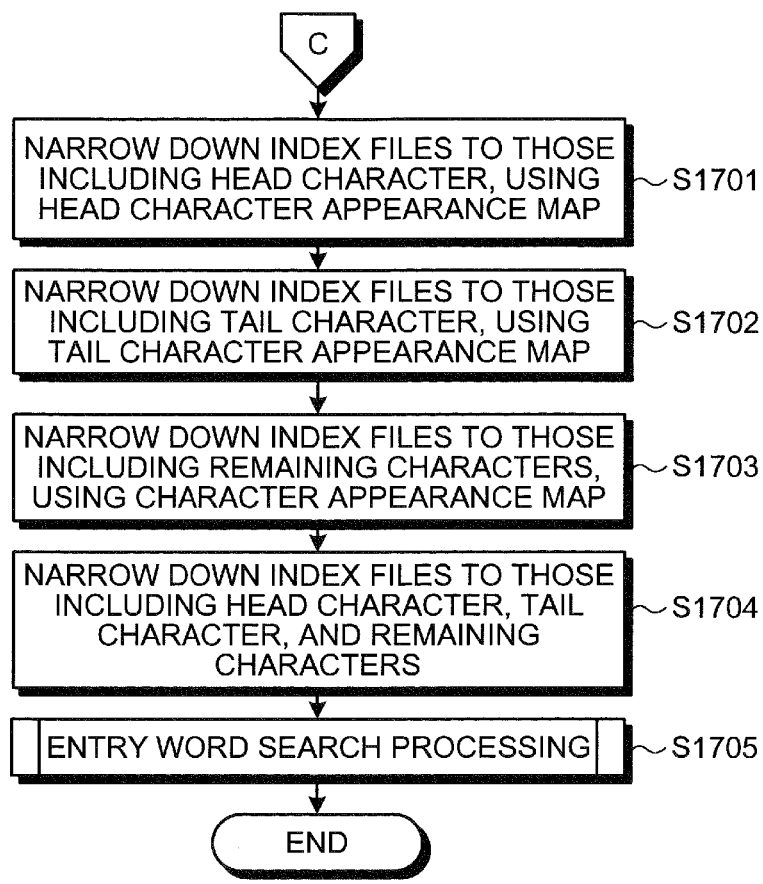
FIG. 17 is a flowchart of information search processing (latter half: full-text search)

FIG. 17 is a flowchart of information search processing (latter half: full-text search). First, the detecting unit 502 narrows down index files to those that include the head character of a search keyword, using the head character appearance map 1200 (step S1701). Next, the detecting unit 502 narrows down index files to those that include the tail character of the search keyword, using the tail character appearance map 1300 (step S1702). Then, the index files are narrowed down to index files that include all remaining characters of the search keyword, using the character appearance map 102 (step S1703).

The index files are then narrowed down to an index file in which the head character, the tail character and the remaining characters are all present (step S1704). By this processing, an index file that remains after narrowing down at step S1701, an index file that remains after narrowing down at step S1702 and an index file that remains after narrowing down at step S1703 that are one in the same is obtained as a file subject to search.

Thereafter, the searching unit 503 and the identifying unit 504 perform entry search processing using the file subject to search (step S1705). This entry search processing (step S1705) is the same processing as the entry search processing (step S1004) depicted in FIG. 10. Thus, an index file that includes a writing keyword, etc. that completely matches the search keyword can be obtained, and full-text search for an entry can be speeded up.

Figure 18:
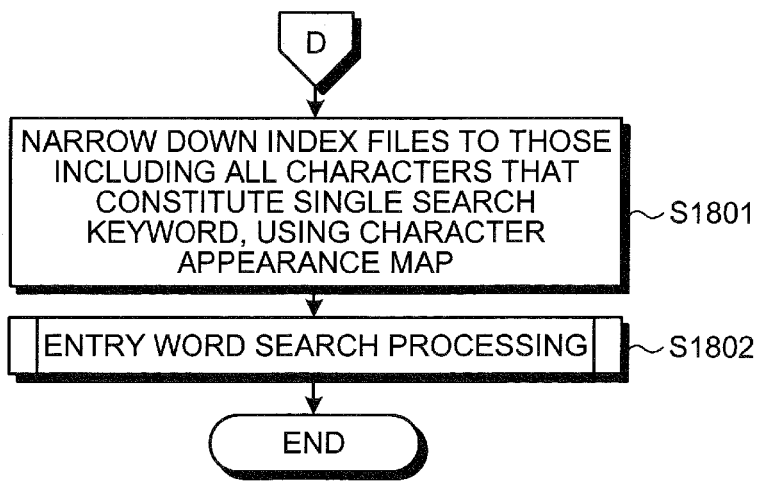
FIG. 18 is a flowchart of information search processing (latter half: partial match search).

FIG. 18 is a flowchart of information search processing (latter half: partial match search). First, the detecting unit 502 narrows down index files to an index file that includes all characters that constitute a single search keyword, using the character appearance map 102 (step S1801). The index file thus obtained after narrowing down is a file subject to search.

Thereafter, the searching unit 503 and the identifying unit 504 perform entry search processing using the file subject to search (step S1802). This entry search processing (step S1802) is the same processing as the entry search processing (step S1004) depicted in FIG. 10. Thus, an index file that includes a writing keyword, etc. that includes a portion that matches the single search keyword can be obtained, and a partial match search for an entry can be speeded up.

As described, in the second embodiment, it is possible to improve the search speed of a forward search, a reverse search, and a full-text search of an entry constituted by a single segment.

As described above, according to the recording medium storing an information search program, the information search apparatus 500, and the information search method of the first and the second embodiments, the non-sorted, non-hierarchical index file group 103 is used in which index files are not sorted in sequence of character codes; writing keywords, etc. are described in order of text file items; and index files have no hierarchical relation therebetween.

Therefore, limitations on the number of search keywords to be input can be removed in entry search, and the accuracy of entry search can be improved while the memory capacity required for the search can be reduced (memory saving).

Furthermore by using the character appearance map 102, index files can be efficiently narrowed down to obtain a file subject to search, and scanning of an index file in which the search keyword is not described can be prevented, thereby improving the search speed. Particularly, by using the head character appearance map 1200 and the tail character appearance map 1300, the search speed of a forward search, a reverse search, and a full-text search of an entry constituted by a single segment can be improved.

The information search method explained in the present embodiment may be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein an information searching program that causes a computer to execute a process, the process comprising:

receiving one or a plurality of search keywords used for searching from a plurality of data items;

specifying a first group of data items utilizing a character appearance map stored in a storage, wherein each of the first group of data items includes all characters constituting the one or a plurality of search keywords, the character appearance map indicating whether each character included in the plurality of data items is included in the plurality of data items, respectively; and searching the one or plurality of search keywords for the first group of data items, wherein the specifying specifies a second group of data items that each include a head character of the one or the plurality of search keywords, based on a head character appearance map stored in the storage, the head character appearance map indicating whether each character in the head character appearance map is included as a head character respectively in the plurality of data items, wherein the specifying also specifies a fourth group of data items from the second group of data items that include both each head character and each tail character of the one or plurality of search keywords, based on a tail character appearance map indicating whether each character in the tail character appearance map is included as a head character respectively in the plurality of data items, wherein the searching searches the one or plurality of search keywords utilizing the second group of data items, and wherein the searching also searches the one or plurality of search keywords utilizing the fourth group of data items.

2. The non-transitory computer-readable recording medium according to claim 1, wherein:
the specifying specifies the first group of data items from the second group of data items based on the character appearance map, and
the searching searches the one or plurality of search keywords utilizing the first group of data items.

3. The non-transitory computer-readable recording medium according to claim 1, wherein:
the specifying specifies a third group of data items that each include a tail character of the one or the plurality of search keyword, based on a tail character appearance map stored in the storage, the tail character appearance map indicating whether each character in the tail character appearance map is included as a tail character respectively in the plurality of data items, and
the searching searches the one or plurality of search keywords utilizing the third group of data items.

4. The non-transitory computer-readable recording medium according to claim 3, wherein:
the specifying specifies the first data items from the third group of data items based on the character appearance map, and
the searching searches the one or plurality of search keywords utilizing the first group of data items.

5. The non-transitory computer-readable recording medium according to claim 1, wherein:
the specifying specifies the first data items from the fourth group of data items based on the character appearance map, and
the searching searches the one or plurality of search keywords utilizing the first group of data items.

6. The non-transitory computer-readable recording medium according to claim 1, the information search program further causing the computer to execute detecting data items that include a tail character of the search keyword, based on a tail character appearance map having, for each character, a flag row indicating, for each data items, whether the character is included as a tail character, wherein:
the searching includes searching the specified data item for a keyword that includes the search keyword.

7. An information searching apparatus comprising a processor and a memory, wherein:
the processor is configured to:
receive one or a plurality of search keywords used for searching from a plurality of keywords;
specify a first group of data items utilizing a character appearance map stored in the memory, wherein each of the first group of data items includes all characters constituting the one or a plurality of search keywords, the character appearance map indicating whether each character included in the plurality of data items is included in the plurality of data items, respectively; and
search the one or plurality of search keywords for the first group of data items,
wherein the processor is also configured to:
specify a second group of data items that each include a head character of the one or the plurality of search keywords, based on a head character appearance map stored in the storage, the head character appearance map indicating whether each character in the head character appearance map is included as a head character respectively in the plurality of data items,
specify a fourth group of data items from the second group of data items that include both each head character and each tail character of the one or plurality of search keywords, based on a tail character appearance map indicating whether each character in the tail character appearance map is included as a head character respectively in the plurality of data items,
search the one or plurality of search keywords utilizing the second group of data items, and
search the one or plurality of search keywords utilizing the fourth group of data items.

8. An information searching method comprising:
receiving and storing one or a plurality of search keywords used for searching from a plurality of data items into a buffer;
specifying, via a processing unit, a first group of data items utilizing a character appearance map stored in a storage, wherein each of the first group of data items includes all characters constituting the one or a plurality of search keywords, the character appearance map indicating whether each character included in the plurality of data items is included in the plurality of data items, respectively; and
searching, via a processing unit, the one or plurality of search keywords for the first group of data items,
wherein the specifying specifies a second group of data items that each include a head character of the one or the plurality of search keywords, based on a head character appearance map stored in the storage, the head character appearance map indicating whether each character in the head character appearance map is included as a head character respectively in the plurality of data items,
wherein the specifying also specifies a fourth group of data items from the second group of data items that include both each head character and each tail character of the one or plurality of search keywords, based on a tail character appearance map indicating whether each character in the tail character appearance map is included as a head character respectively in the plurality of data items,
wherein the searching searches the one or plurality of search keywords utilizing the second group of data items, and wherein the searching also searches the one or plurality of search keywords utilizing the fourth group of data items.

* * * * *